United States Patent [19]

Crane

[11] Patent Number: 5,713,584
[45] Date of Patent: Feb. 3, 1998

[54] MULTI-VARIANT CART CONSTRUCTION FOR TRANSPORTING LIGHTING EQUIPMENT

[76] Inventor: Brian J. Crane, 19960 Friar St., Woodland Hills, Calif. 91367

[21] Appl. No.: 368,868

[22] Filed: Jan. 5, 1995

[51] Int. Cl.⁶ ............................................. B62B 3/02
[52] U.S. Cl. .................. 280/47.35; 211/126; 280/79.3; 312/249.12; 312/265.4
[58] Field of Search ........................ 211/60.1, 126; 280/47.35, 79.11, 79.3; 312/249.8, 249.11, 249.12, 249.13, 265.1, 265.4, 283, 290

[56] References Cited

U.S. PATENT DOCUMENTS

| | | | |
|---|---|---|---|
| 526,395 | 9/1894 | Johns | 280/79.11 X |
| 2,772,113 | 11/1956 | Berard | 280/47.35 |
| 3,199,683 | 8/1965 | Graswich | 211/126 X |
| 3,393,031 | 7/1968 | Morrill | 211/126 X |
| 3,472,392 | 10/1969 | Hahn | 211/126 |
| 3,712,638 | 1/1973 | Lipinsky | 280/79.11 |
| 3,797,842 | 3/1974 | Swick, Jr. et al. | 280/47.35 X |
| 3,967,734 | 7/1976 | Morgan et al. | 211/126 X |
| 4,032,165 | 6/1977 | Russell | 280/79.3 |
| 4,458,906 | 7/1984 | Lamson | 280/79.11 X |
| 4,958,841 | 9/1990 | Keen | 280/47.35 |
| 5,257,794 | 11/1993 | Nakamura | 280/79.3 |
| 5,372,262 | 12/1994 | Benson et al. | 280/79.3 X |

Primary Examiner—Brian L. Johnson
Assistant Examiner—Michael Mar
Attorney, Agent, or Firm—Robert J. Schaap

[57] ABSTRACT

A cart containing a plurality of individual shelves for supporting removable drawers or cartons adapted to contain lighting equipment, along with additional storage areas. The cart is constructed with a main frame having a lower base frame adaptable for use in a large number of cart constructions. In all cases, the cart main frame has a similar upright frame arrangement, but which can be modified and customized from cart to cart, so that the cart may carry individual storage shelves, compartments for containers, outrigger elements for supporting lighting equipment, etc. In this way, the main frame is modular and a large number of carts may be constructed from this essentially one basic modular main frame construction. In all cases, the cart is constructed of tubular rod and flat metal material, so that it is rigid, but relatively light in weight. The cart may also be formed with an upright frame or super structure for holding large vertically arranged pieces of lighting equipment and may contain hooks uniquely located for carrying lighting assembly fixtures, such as lighting assembly support stands and the like. Large diameter casters are used on the base frame of the cart for even distribution of weight and permitting the transportability of fairly heavy loads. Several embodiments of the cart are shown herein.

12 Claims, 13 Drawing Sheets

MULTI-VARIANT CART CONSTRUCTION FOR TRANSPORTING LIGHTING EQUIPMENT

BACKGROUND OF THE INVENTION

1. Field of the Invention

This invention relates in general to certain new and useful improvements in carts for the transporting of lighting equipment and more particularly, to a cart which can be constructed in a variety of forms from a basic construction module and which is used in the transporting of lighting equipment for use in stage and background lighting as, for example, in movie and televisions recordings. The cart is light in weight, but yet sturdy in construction and enables the lighting technician to store and transport essentially all of the equipment needed in a lighting installation.

2. Brief Description of the Prior Art

Lighting arrangements used in the making of television and movie recordings, such as films, video tapes and the like, can be quite complex. A lighting technician, or lighting director, is oftentimes required in order to determine what lighting arrangement should be used to obtain a desired effect and to achieve the best over-all recording. In many cases, numerous types of equipment are employed in order to achieve the desired lighting arrangement. As a simple example, numerous stands and other fixtures may be required to obtain a particular lighting effect.

Usually, most lighting arrangements are achieved on a trial and error basis, that is, the technician attempts to use certain fixtures and lamps in a certain array and positional arrangement and determines whether or not the desired effect is achieved. If the desired effect is not that which the technical and the director desires, different fixtures, stands or the like, may be employed. This process continues until the desired lighting effect is achieved.

Generally, in all cases, it is important to have different types and different sizes of lighting components available at a particular set so that various combinations of these components can be used and effectively tried in a trial and error mode. Very often, very high priced talent, such as movie and television stars are located on the set and production costs can increase substantially if this high priced talent is forced to sit idly while a desired lighting arrangement is achieved. This problem would be aggravated if the technician were required to run to a storage facility in order to obtain a particular fixture or the like. Consequently, it is necessary to have all of the reasonably useable equipment available at a set or stage.

Heretofore, there have been some make-shift carts in which a technician attempts to store and transport some or all of the equipment which may be needed at a particular set or stage. Very often, these carts are not designed with specific demands of the type required for use in transporting and storing lighting equipment. In many cases, the carts are of a poor construction and are flimsy, but in all cases, do not have the facilities for carrying all of the desired equipment in an efficient manner.

Very frequently, a particular facility, such as a stage or set, will have peculiar needs for lighting arrangements which are not found in facilities. Accordingly, a cart is needed for the storage and transport of the equipment desired for that particular stage set or facility. The equipment for this facility may differ from that which is used frequently in another facility. Accordingly, the cart must be custom constructed to meet the demands of a particular facility.

There have been a few recent attempts to provide carts for use in transporting stage lighting equipment. However, these attempts to produce such commercially available carts have also suffered from the same disadvantages as those carts which were made on an individual basis for use by a particular user. Heretofore, there has not been any effective cart for transporting lighting equipment which is quite sturdy, light in weight and easily maneuverable and yet, which is capable of carrying all of the necessary lighting equipment used in stage lighting.

OBJECTS OF THE INVENTION

It is, therefore, one of the primary objects of the present invention to provide a cart for the transporting of lighting equipment, and which cart is relatively light in weight, but sturdy in construction and capable of transporting essentially all of the necessary equipment used in stage lighting.

It is another object of the present invention to provide a cart of the type stated which is made in such a manner that lighting equipment can be easily stored therein and easily removed therefrom.

It is a further object of the present invention to provide a cart for the transporting of lighting equipment, of the type stated, which is capable of utilizing extended hooks and racks for transportation of large fixtures and the like.

It is an additional object of the present invention to provide a cart for the transporting of lighting equipment used in stage lighting which is relatively inexpensive and which is superior to any commercially available cart used in this industry.

It is another salient object of the present invention to provide a cart for the transporting of lighting equipment of the type stated and which can utilize a basic frame structure capable of being modified to provide a number of different embodiments and also modified to become effectively customized to a user's particular requirements.

It is also an object of the present invention to provide a cart for the transporting of lighting equipment of the type stated, which can be designed with shelves and compartments for storage of lighting equipment or alternately, with large storage spaces and combinations thereof in order to effectively meet a particular user's requirements.

With the above and other objects in view, my invention resides in the novel features of form, construction, arrangement and combination of parts presently described and pointed out in the claims.

BRIEF SUMMARY OF THE INVENTION

The present invention generally comprises a cart used in the transporting of lighting equipment of the type normally employed in stage lighting arrangements. In this case, the term "stage lighting" is used in a broad context to employ any type of set lighting arrangement in which lighting is used for purposes of recording movies or television activities or presenting performances.

The cart of the present invention is constructed largely of tubular metal rods which are used in a frame structure. In addition, flat metal straps are also used in the overall construction of the frame forming part of the cart. In this way, each cart can be manufactured so that it is relatively light in weight, but yet quite sturdy in construction.

The carts of the present invention comprise a main frame structure, as aforesaid, and this main frame structure utilizes a base frame which is generally rectangular in shape. The base frame for each cart is generally of a similar construction, including a pair of longitudinally extending frame members connected by two or more spaced apart transversely extending frame members. A caster or wheel mounting assembly is located on the underside of the base frame in the four corners thereof for holding a conventional wheel or caster.

Each of the main frames are comprised of tubular members, as aforesaid, along with straps, also as aforesaid. For that matter, even the base frame is comprised of tubular members and/or straps. In this way, each cart can be modified as desired in order to conform to the demand requirements of a particular user. Further, and in this respect, each cart can be customized from essentially the same main frame structure.

The carts of the present invention are uniquely constructed so that they are provided with individual compartments, and with each compartment receiving a carton in the nature of a box and which often resembles a milk carton. Each individual compartment is provided with runners or tracks, or like structure, in order to removably receive a carton, enabling a carton to be easily removed from the individual compartment and reinserted therein.

The frame forming part of the cart is also constructed so that larger spaces are provided for storage of larger pieces of lighting equipment. The storage spaces are also provided with shelves and floor surfaces so that the equipment can rest on a flat surface, rather than for suspension between a pair of spaced-apart frame members. Bottom plates are mounted on the lower end of the frame for supporting removable casters. These plates are located at the four corners of the rectangularly-shaped frame. Moreover, the plates are constructed, and the casters employed are such that the casters are removable, permitting substitution of different casters. In this way, the cart can be modified to conform to different design requirements.

The carts, for transporting and storage of lighting equipment of the present invention may be constructed with extended hooks and like supporting structure for supporting various types of lighting fixtures and the like. In this way the cart is uniquely constructed so that it is capable of retaining and transporting essentially all of the equipment used in providing a lighting arrangement for a particular set.

In essentially all cart constructions, there is a plurality of upright tubular frame members connected to and extending upwardly from the base frame. These upright frame members are designed to form individual storage compartments or supports for shelves and the like. Also, in most, if not all, cart constructions, a plurality of tubular horizontally extending frame members are connected to and extend between the upright frame members. In this way, individual storage compartments, shelves and the like may be formed.

This invention has many other objects and advantages and other purposes which will become more apparent from a consideration of the forms in which the cart of the invention may be embodied. Several of these forms of the cart are shown in the accompanying drawings and are more fully hereinafter described in detail in the following detailed description of the invention. However, it is to be understood that these accompanying drawings and the following detailed description are set forth only for purposes of illustrating the general principles of the invention and are not to be taken in a limiting sense.

BRIEF DESCRIPTION OF THE DRAWINGS

Figure 1:
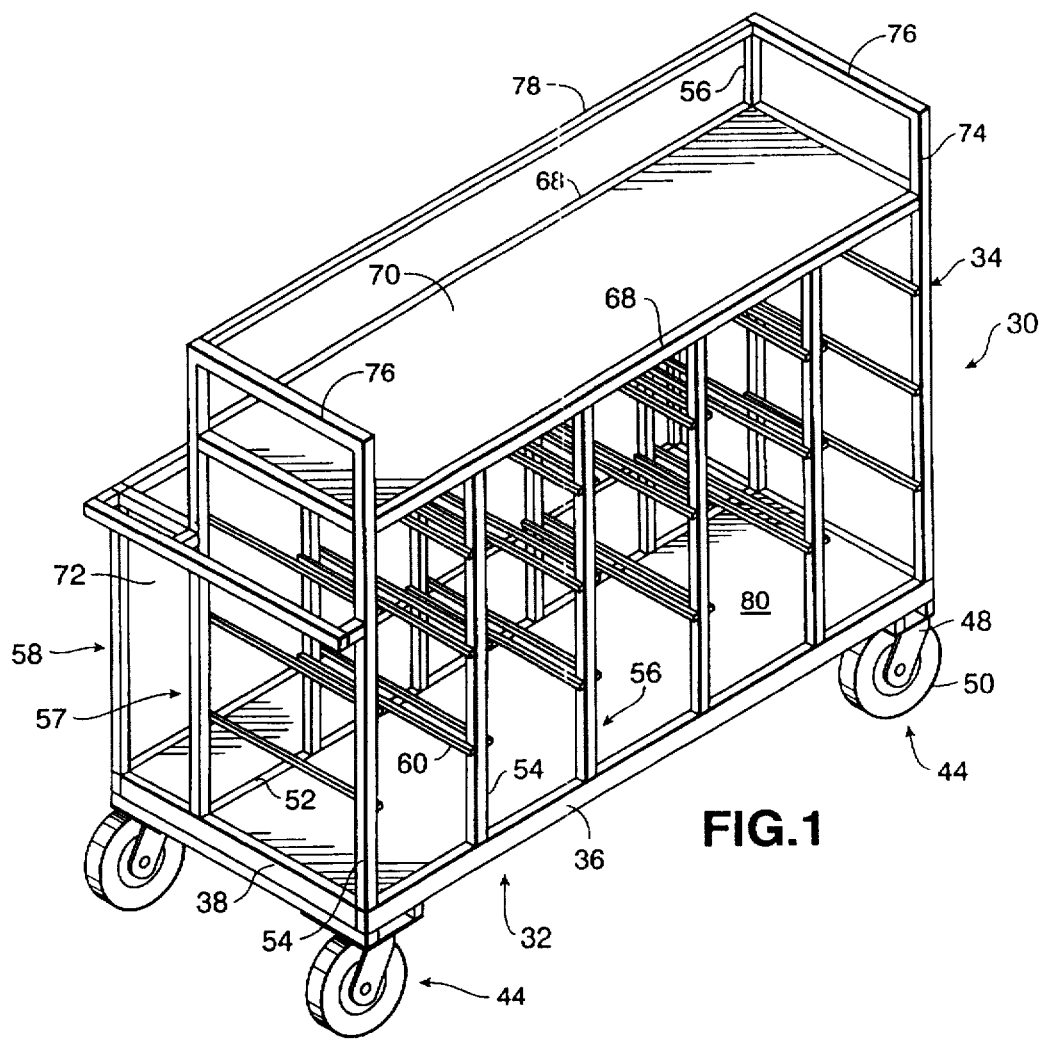
Figure 2:
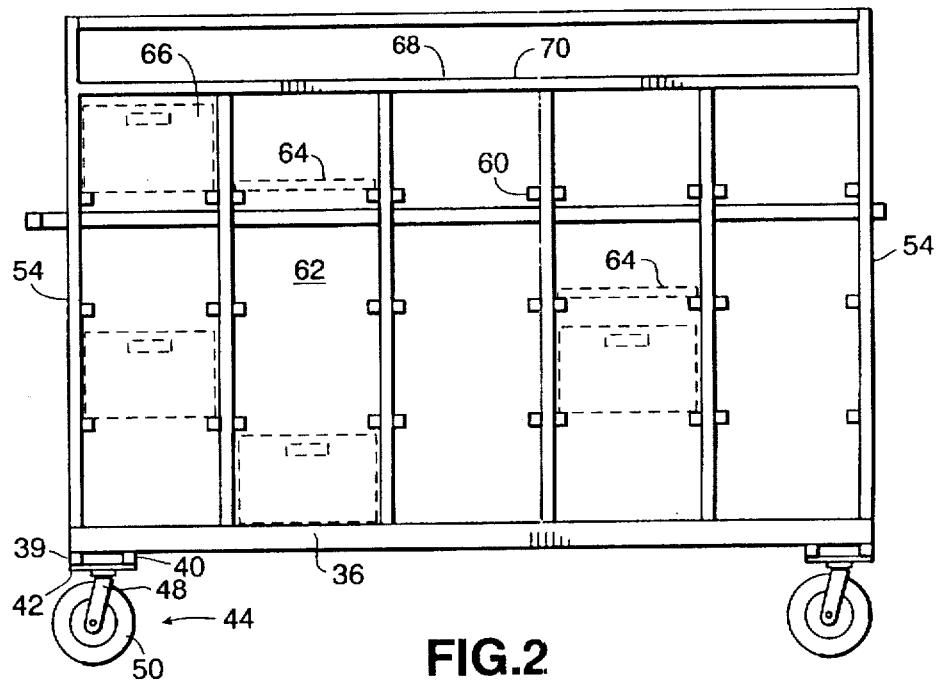
Figure 3:
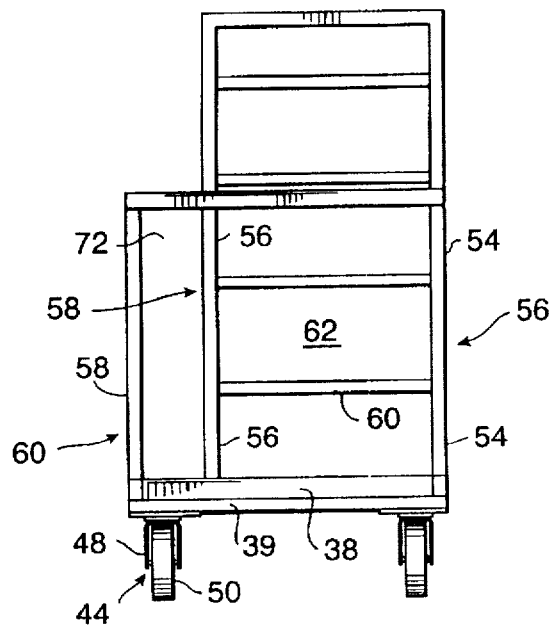
Figure 4:
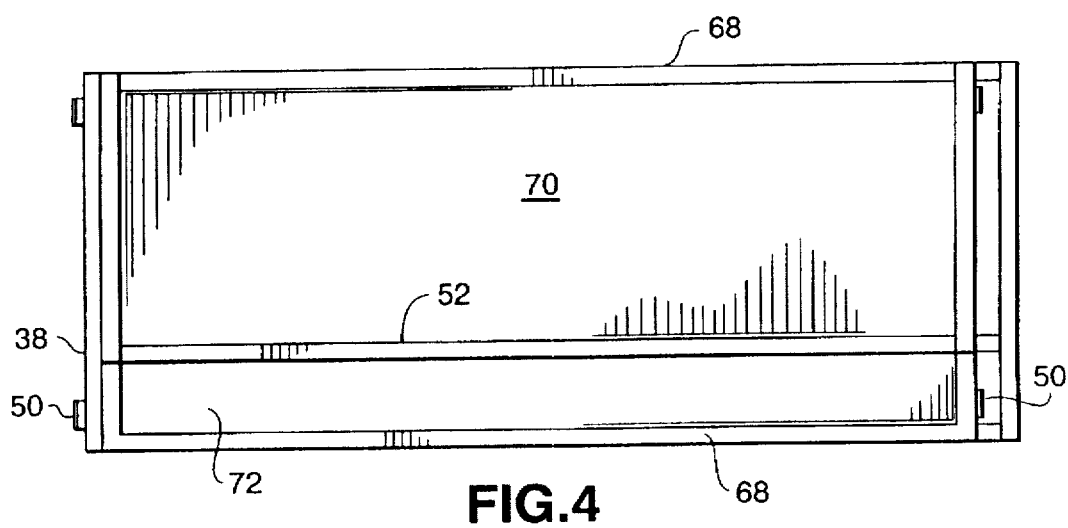
Figure 5:
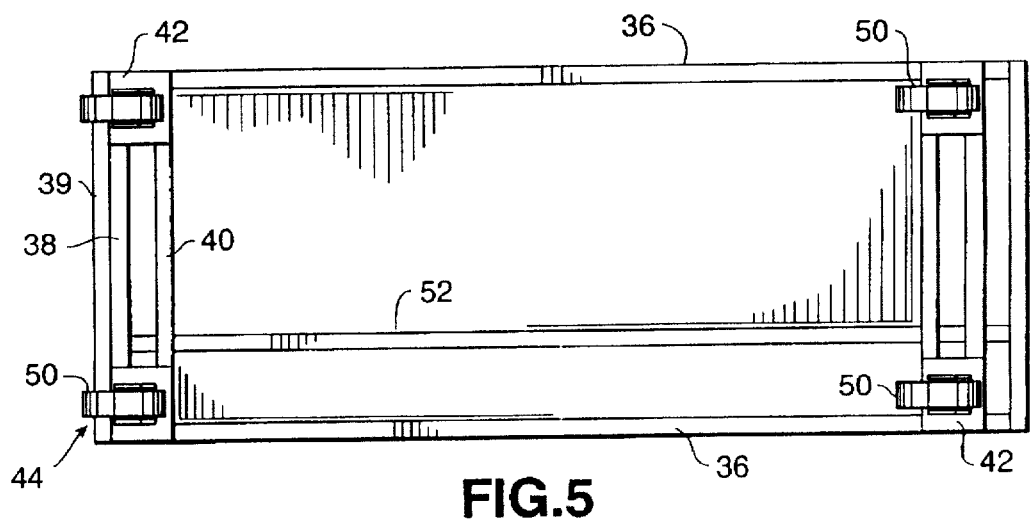
Figure 6:
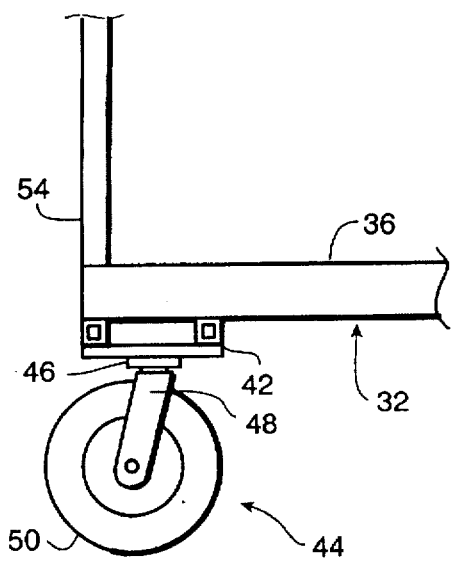
Figure 7:
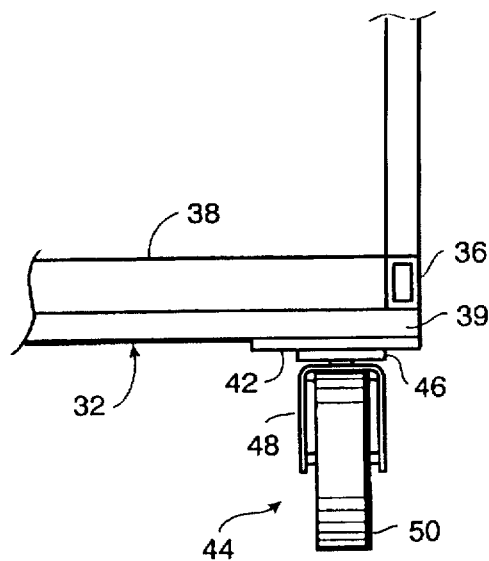
Figure 8:
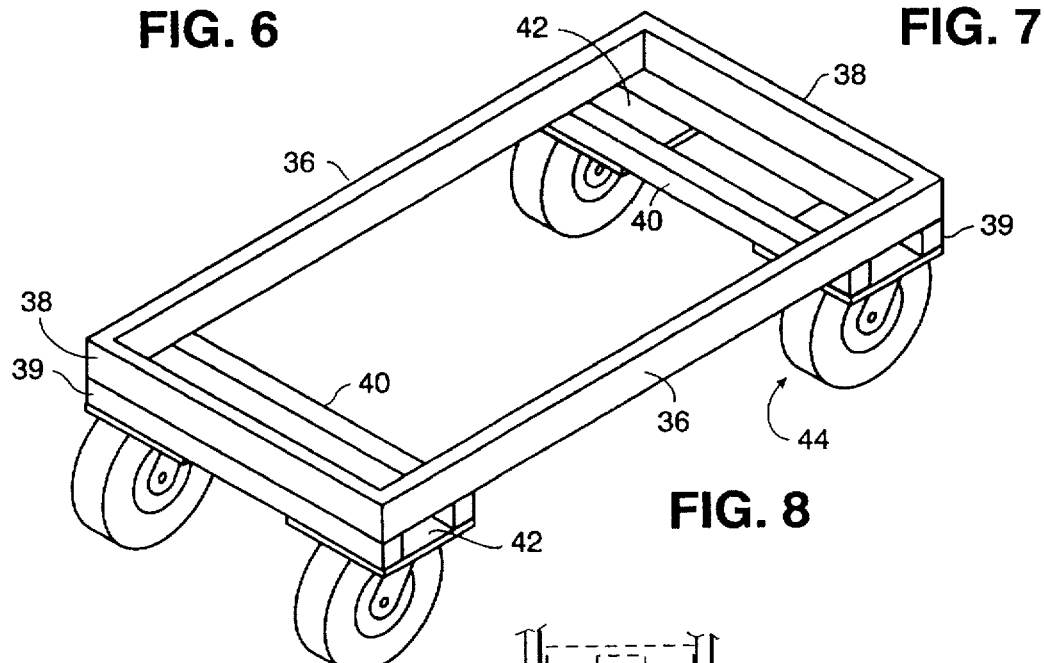
Figure 9:
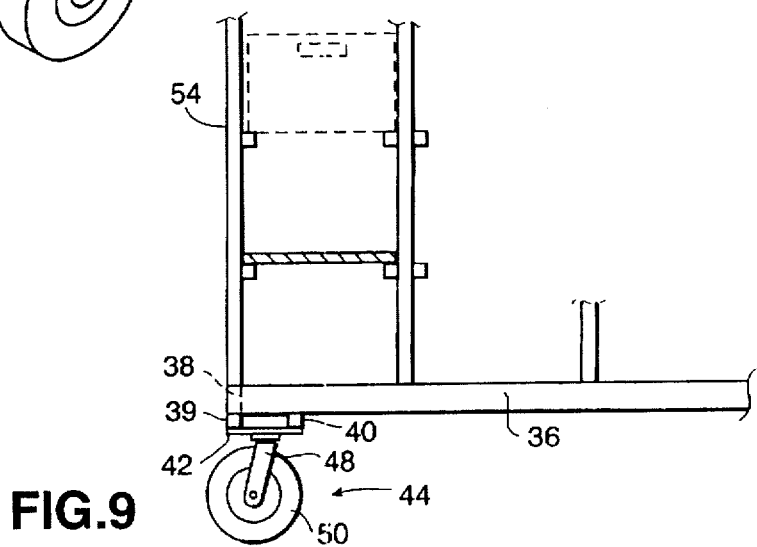
Figure 10:
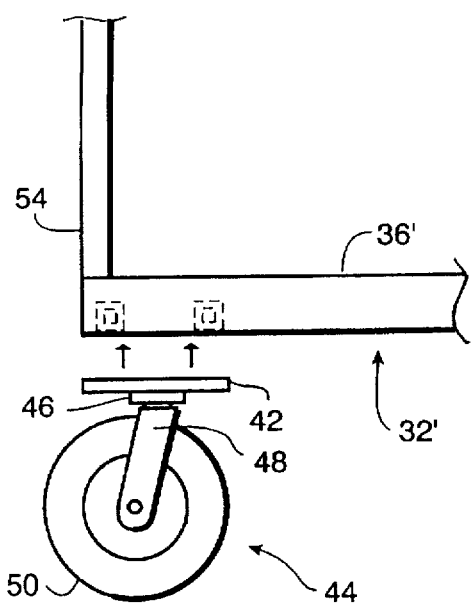
Figure 11:
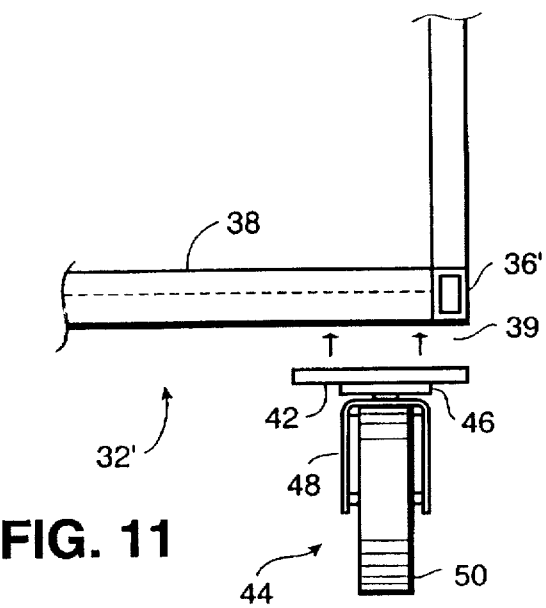
Figure 12:
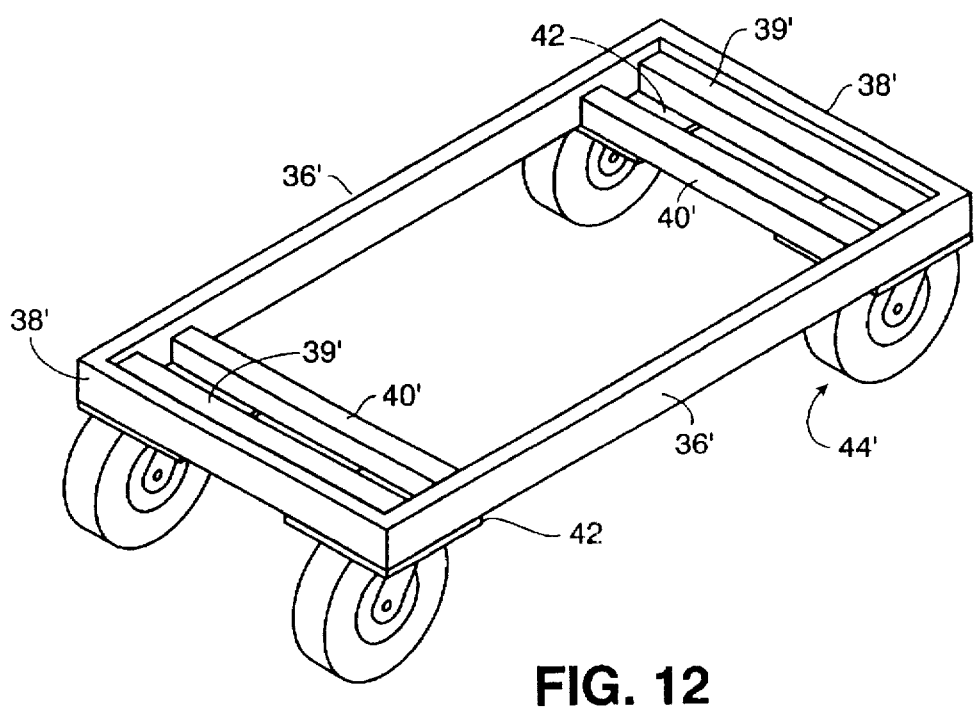

Having thus described the invention in general terms, reference will now be made to the accompanying drawings in which:

FIG. 1 is a perspective view of a cart constructed in accordance with and embodying the present invention;

FIG. 2 is a side elevational view of the cart of FIG. 1;

FIG. 3 is a left-hand end elevational view of the cart of FIG. 1;

FIG. 4 is a top plan view of the cart of FIG. 1;

FIG. 5 is a bottom plan view of the cart of FIG. 1;

FIG. 6 is a fragmentary side elevational view showing a portion of the base frame construction forming part of the cart in accordance with the present invention;

FIG. 7 is an end elevational view of the base frame forming part of the frame in the cart of the present invention;

FIG. 8 is a perspective view of the base frame and attached casters forming part of the cart constructed in accordance with and embodying the present invention;

FIG. 9 is fragmentary side elevational view showing a portion of the base frame and upright frame members forming part of an upper frame connected thereto; invention;

FIG. 10 is a fragmentary side elevational view showing a portion of a modified form of base frame construction forming a part of the cart in accordance with the present invention;

FIG. 11 is an end elevational view of the modified form of the base frame construction shown in FIG. 10;

FIG. 12 is a perspective view of the modified form of base frame construction shown in FIGS. 10 and 11 with attached casters forming part of the cart in accordance with the present invention.

Figure 13:
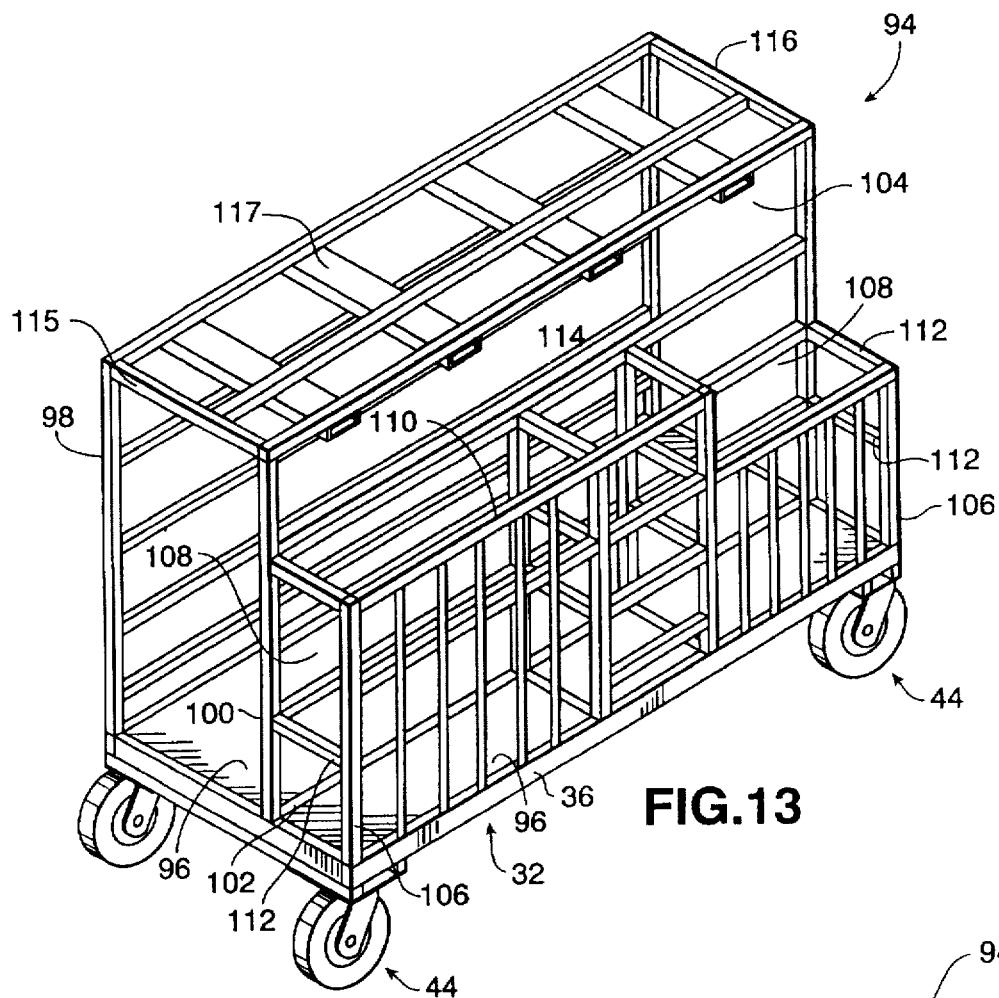
Figure 14:
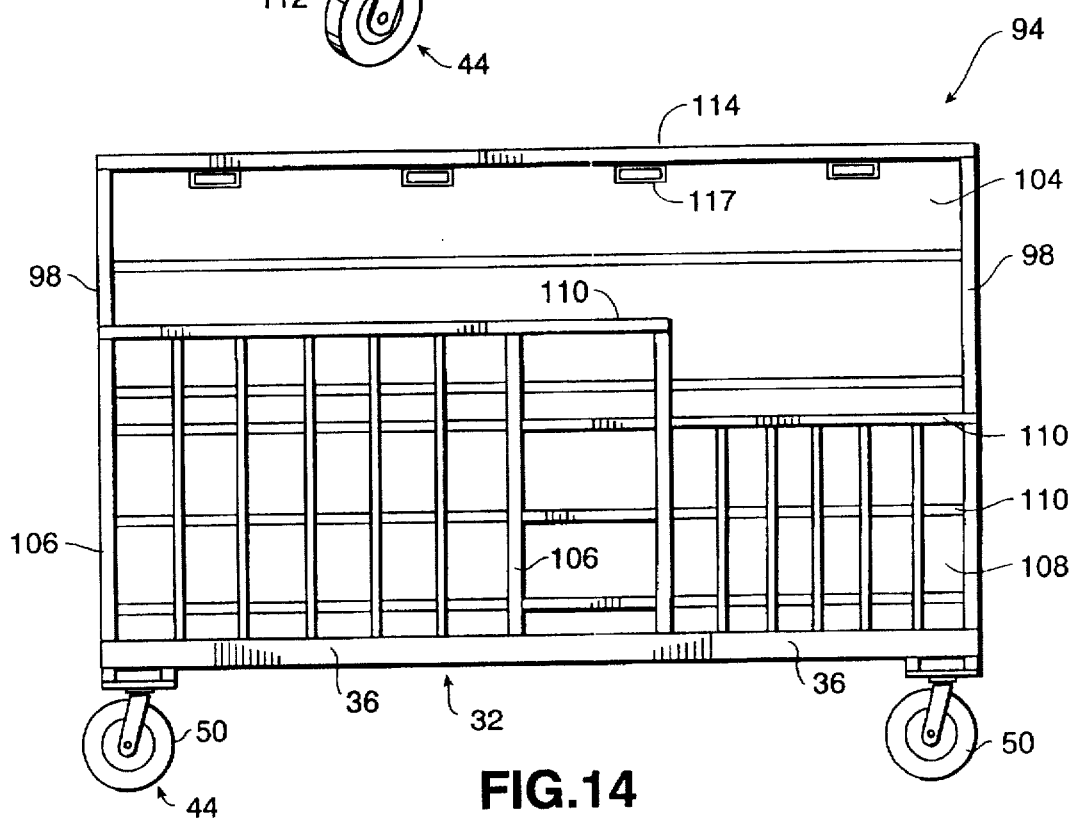
Figure 15:
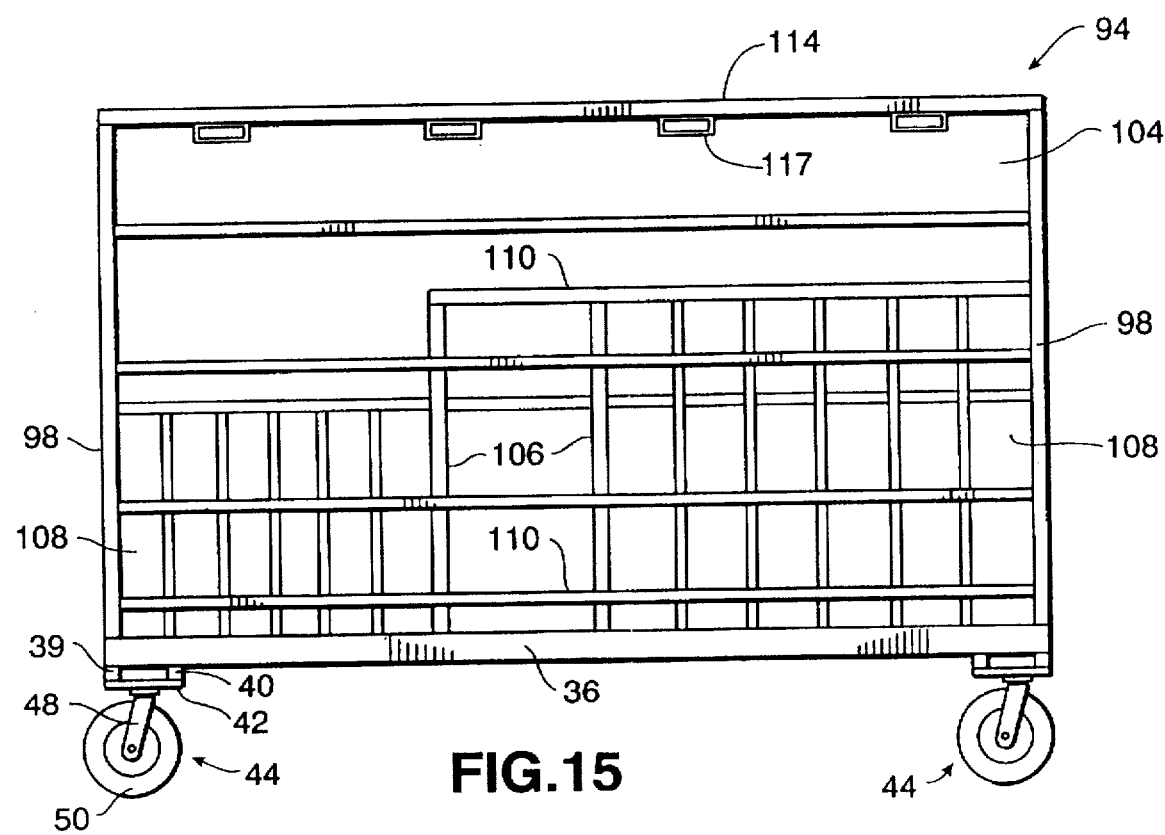
Figure 16:
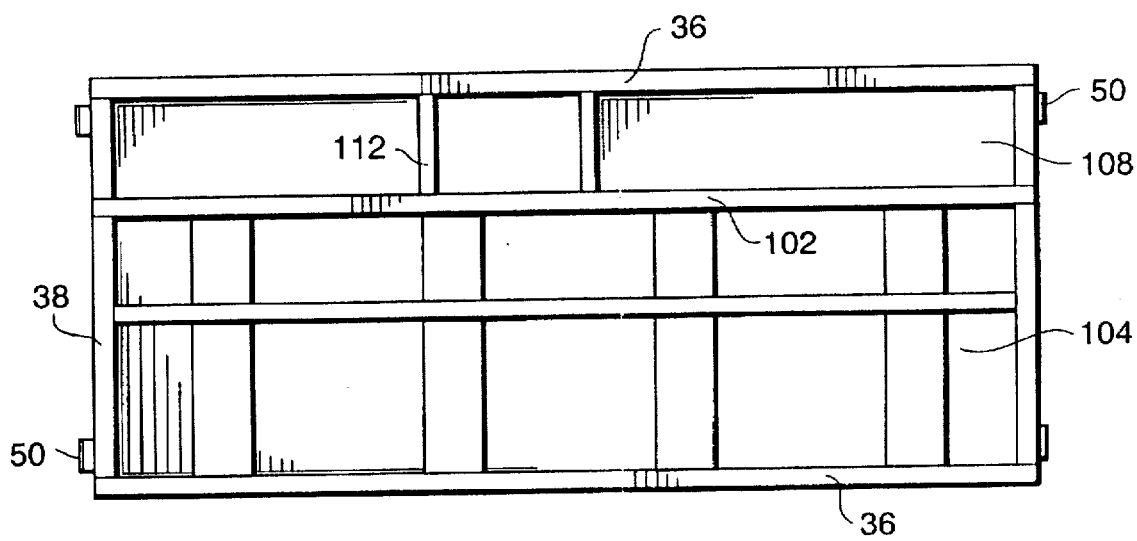
Figure 17:
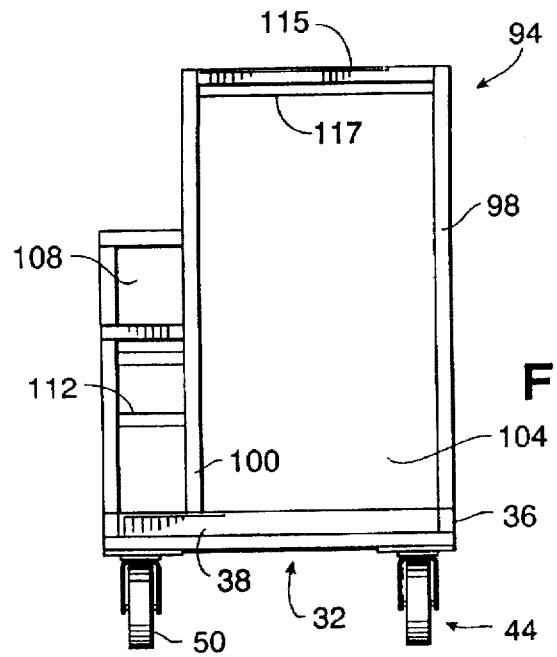
Figure 18:
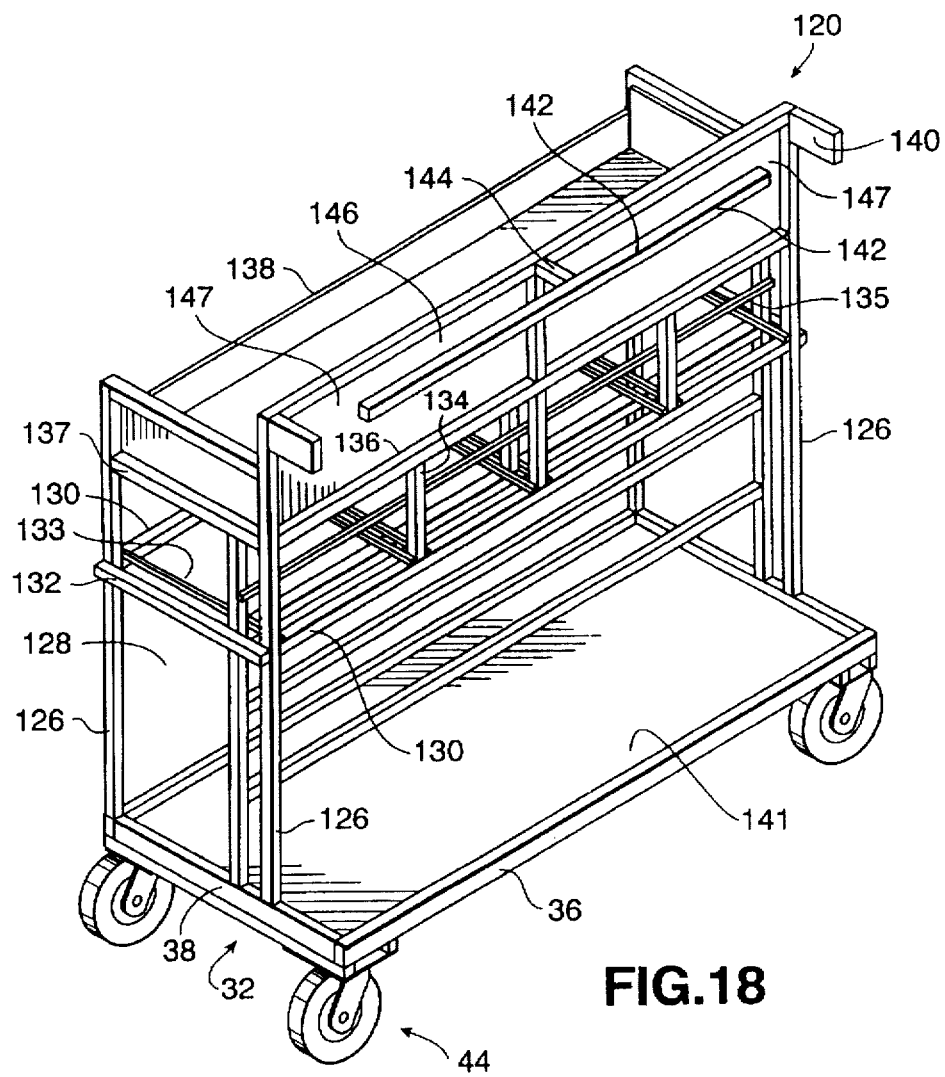
Figure 19:
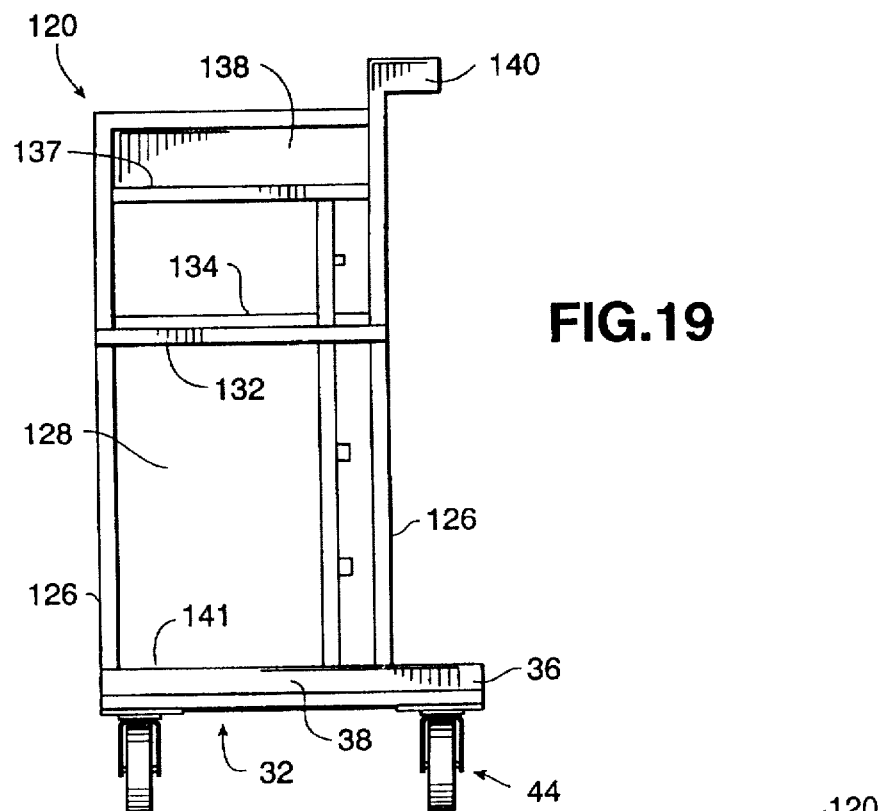
Figure 20:
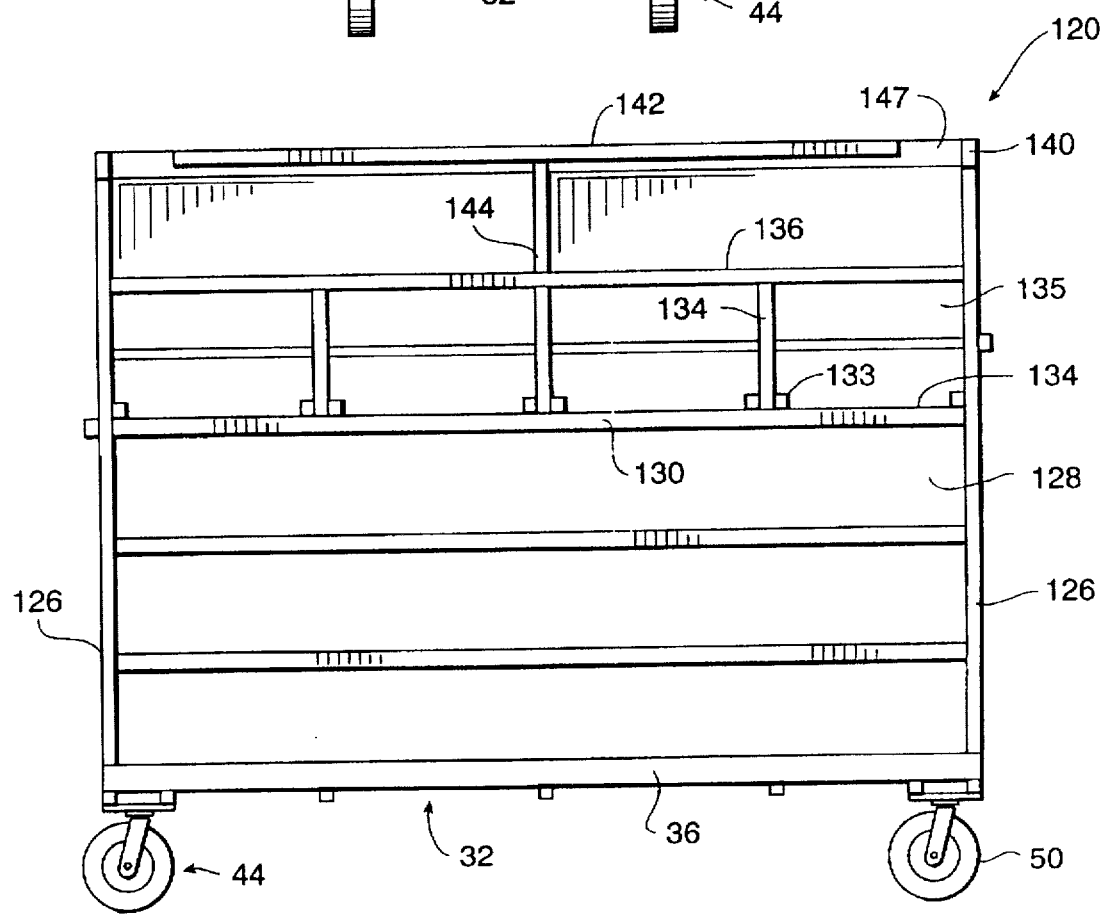
Figure 21:
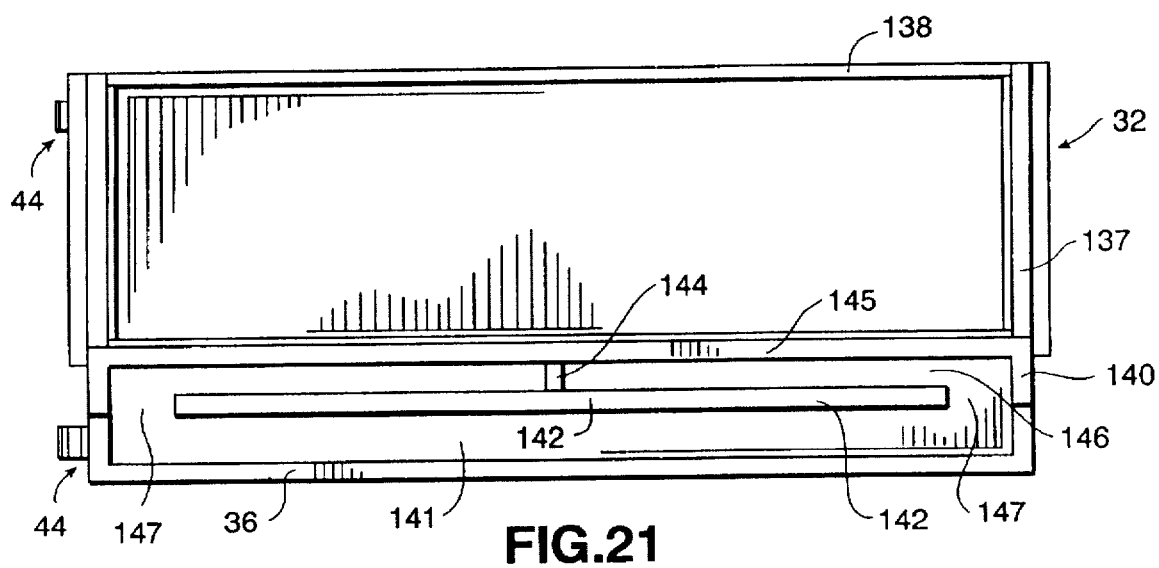
Figure 22:
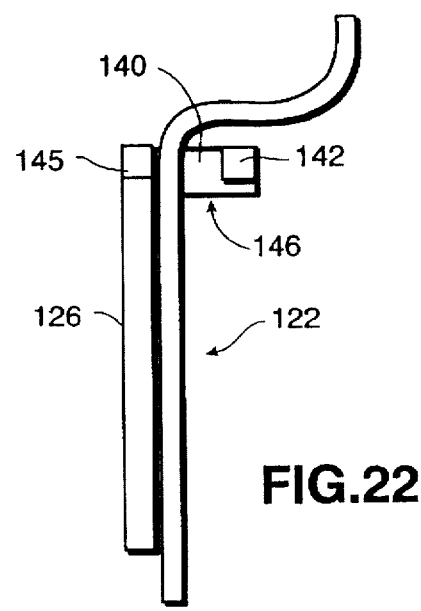
Figure 23:
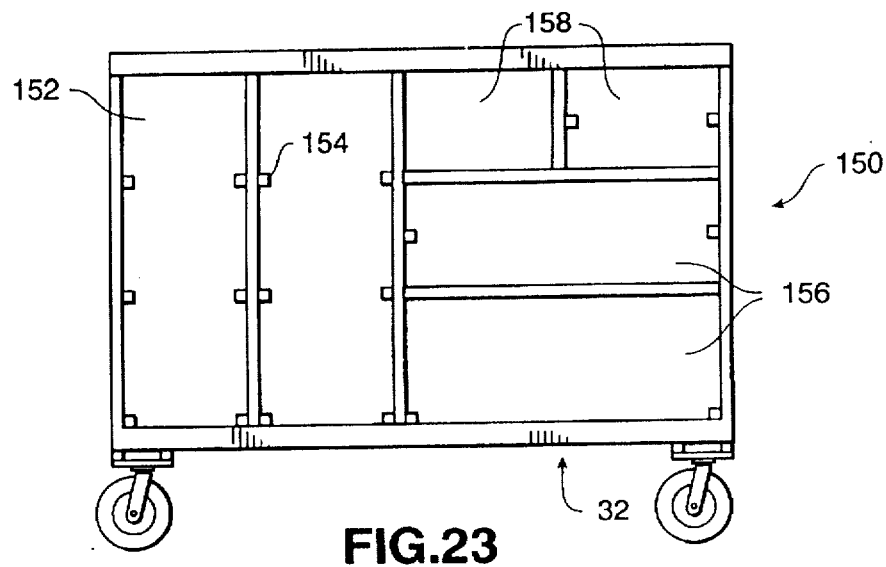
Figure 24:
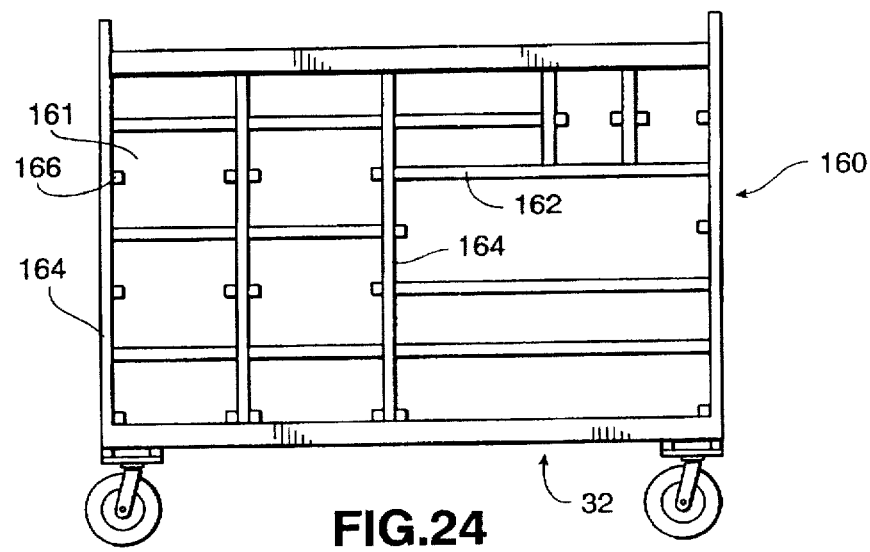
Figure 25:
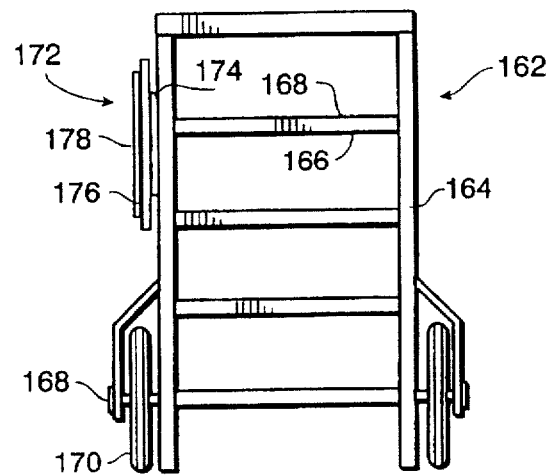
Figure 26:
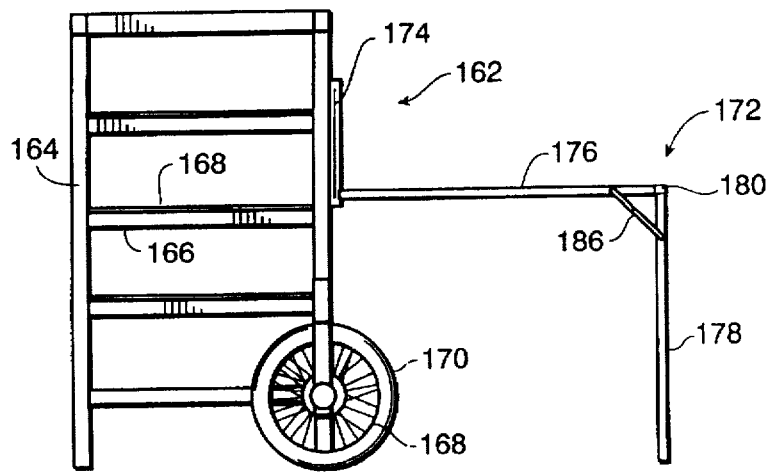
Figure 27:
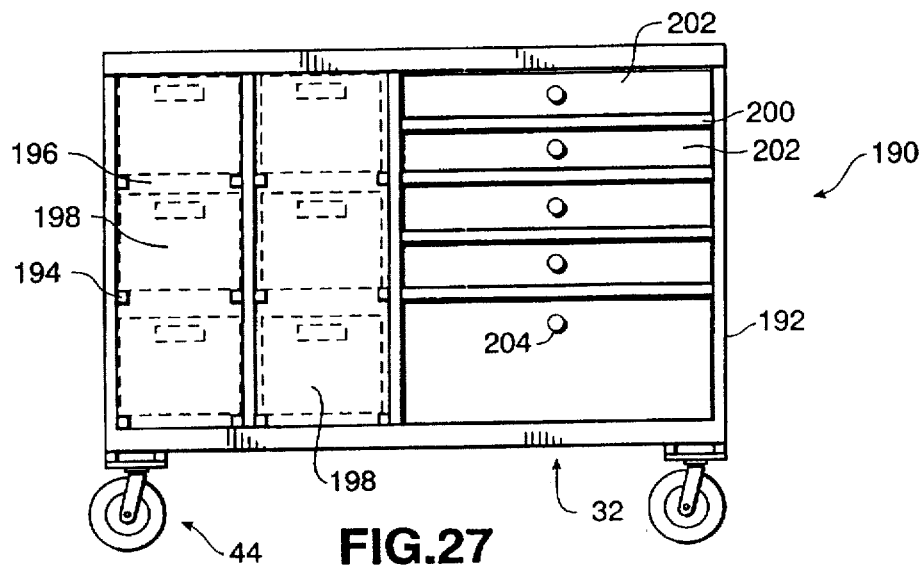
Figure 28:
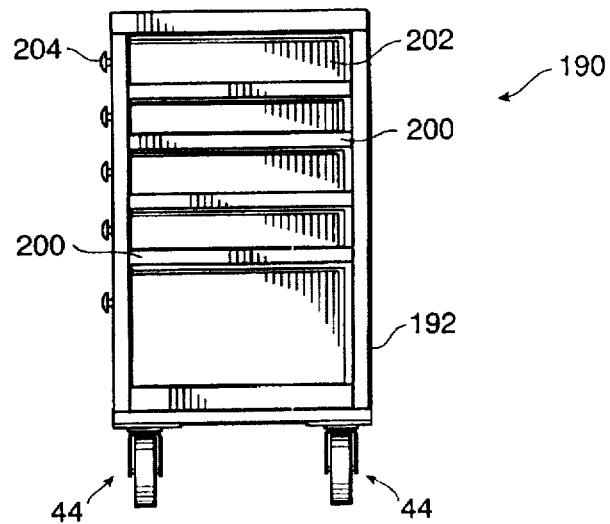
Figure 29:
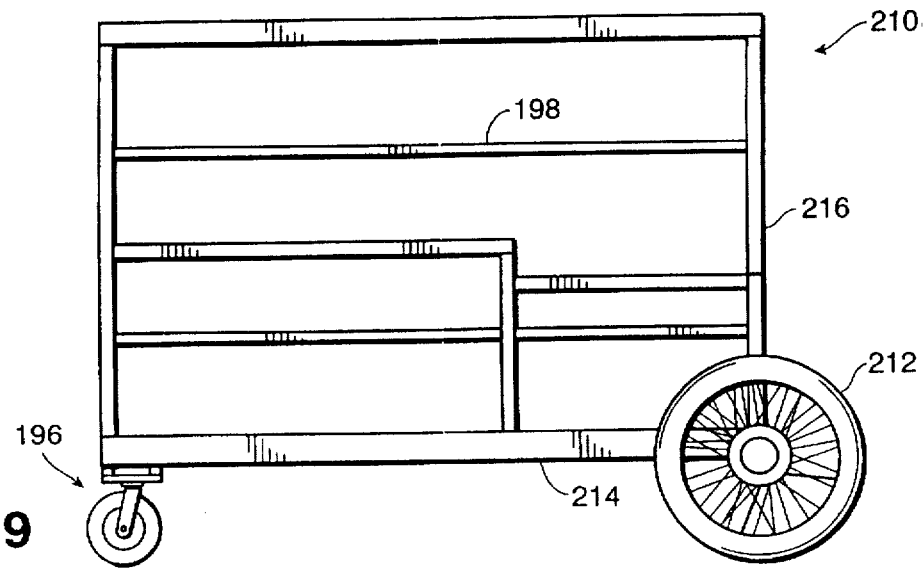
Figure 30:
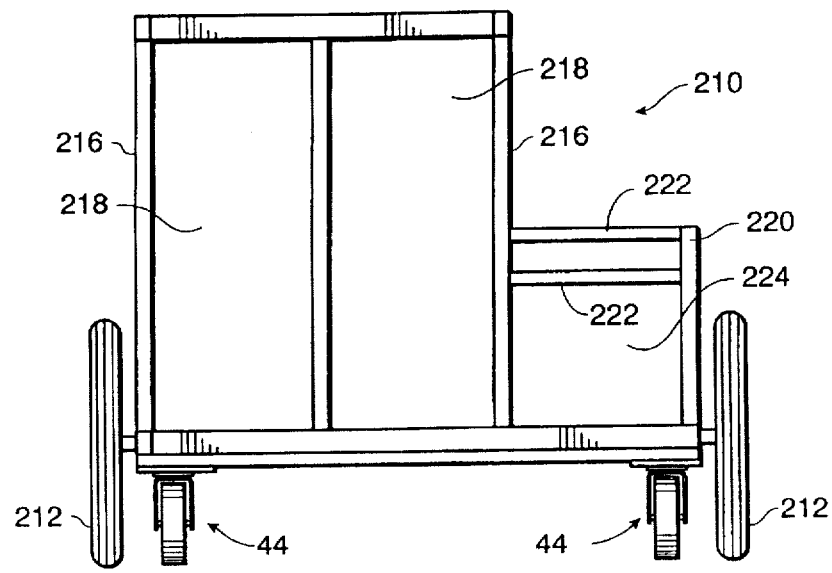
Figure 31:
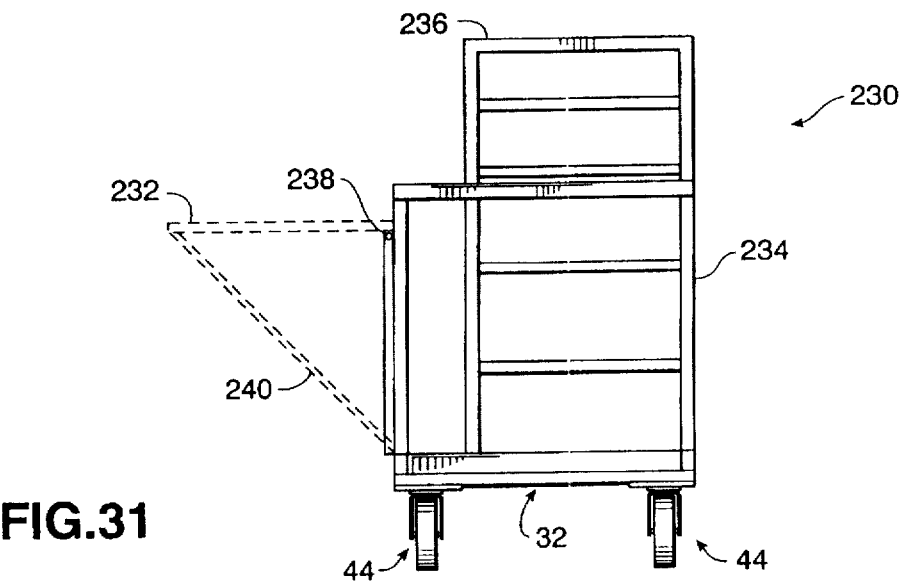
Figure 32:
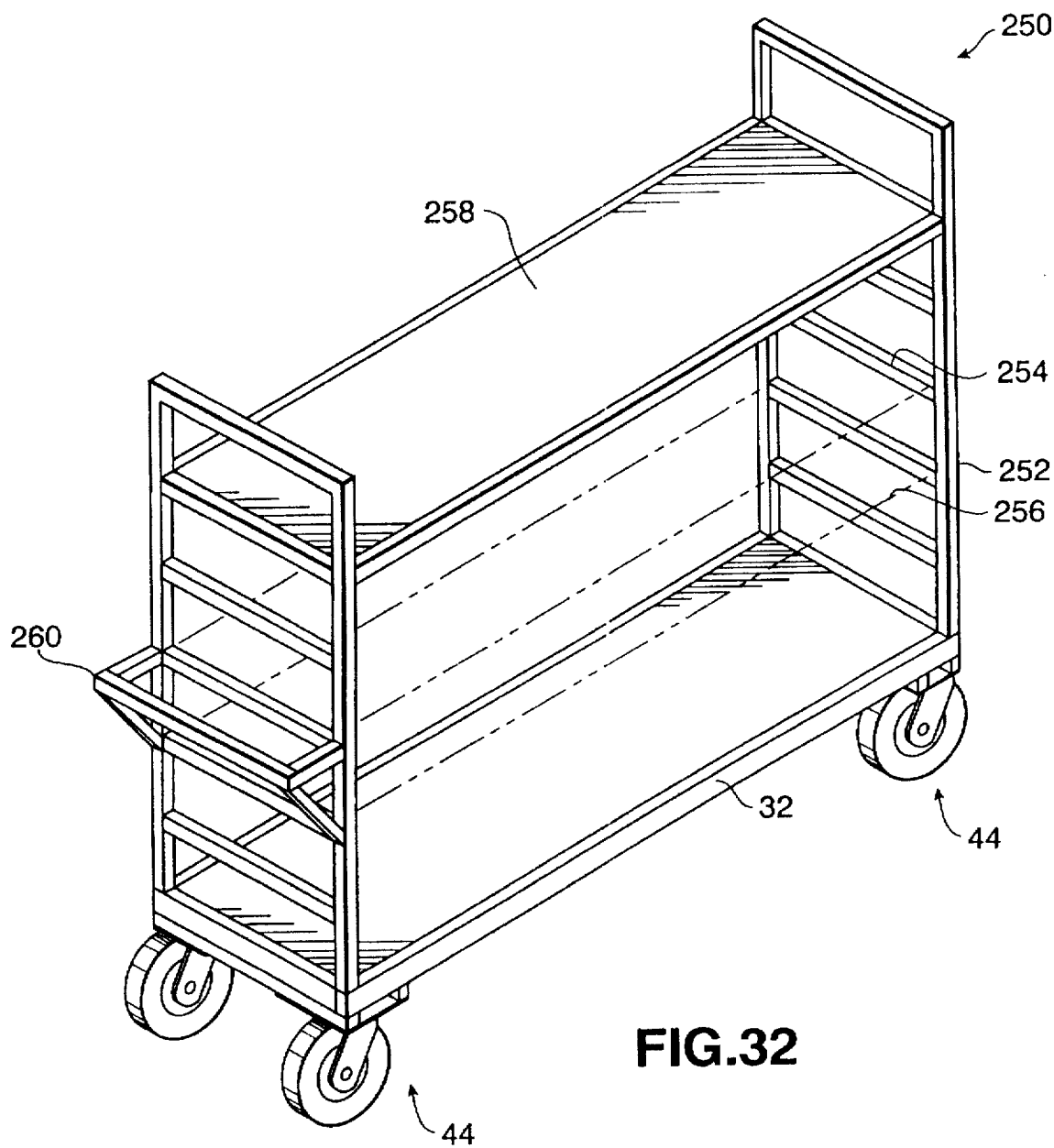

FIG. 13 is a perspective view of another modified form of cart constructed in accordance with and embodying the present invention;

FIG. 14 is a side elevational view of the cart of FIG. 13;

FIG. 15 is an opposite side elevational view of the cart of FIG. 13;

FIG. 16 is a top plan view of the cart of FIG. 13;

FIG. 17 is a right-hand end elevational view of the cart of FIG. 13;

FIG. 18 is a perspective view of yet another modified form of cart constructed in accordance with and embodying the present invention;

FIG. 19 is a right-hand end elevational view of the cart of FIG. 18;

FIG. 20 is a side elevational view of the cart of FIG. 18;

FIG. 21 is a top plan view of the cart of FIG. 18;

FIG. 22 is one form of hook-containing rod which may be used with the cart of FIG. 18;

FIG. 23 is a side elevational view of still a further modified form of cart constructed in accordance with and embodying the present invention;

FIG. 24 is a side elevational view of yet another modified form of cart constructed in accordance with and embodying the present invention;

FIG. 25 is an end elevational view of still another modified form of cart constructed in accordance with and embodying the present invention;

FIG. 26 is a side elevational view of the cart of FIG. 25 with an opened table constructed in accordance with and embodying the present invention;

FIG. 27 is a side elevational view of still a further modified form of cart constructed in accordance with and embodying the present invention;

FIG. 28 is an end elevational view of the cart of FIG. 27;

FIG. 29 is a side elevational view of a cart utilizing wheels and casters in accordance with the present invention;

FIG. 30 is an end elevational view of the cart of FIG. 29;

FIG. 31 is an end elevational view of still a further modified form of cart constructed in accordance with and embodying the present invention; and FIG. 32 is a perspective view of yet another modified form of cart constructed in accordance with and embodying the present invention.

DETAILED DESCRIPTION OF PREFERRED EMBODIMENTS

Referring now in more detail and by reference characters to the drawings which illustrate several embodiments of carts which may be constructed in accordance with the present invention, FIGS. 1–5 of the drawings illustrate one basic form of cart construction 30 and which is comprised of a base frame 32 and an upright frame, or so-called "upper frame" 34. In this respect, each of the carts of the present invention, including the hereinafter described embodiments of the carts, will include the base frame 32 along with an upper frame 34.

Referring to FIGS. 6–9, the base frame 32 is illustrated in more detail. The base frame 32 comprises a pair of transversely spaced apart longitudinally extending frame members 36 which are connected at their ends by a pair of longitudinally spaced apart transversely extending frame members 38. In this case, and in most of the embodiments of the present invention, the frame members 38 are welded to or otherwise, rigidly secured to the ends of the longitudinally extending frame members 36.

In essentially all of the constructions of the base frame 32, an additional pair of transversely extending frame members 39 and 40 are secured at the opposite transverse ends to the underside of each of the longitudinally extending frame members 36 in proximity to each of the transverse frame members 38. Thus, and in this respect, each of the frame members 39 and 40 constitute a pair at one end, and the frame members 39 and 40 constitute a pair of the frame members at the opposite end.

Each of the frame members previously described, including the longitudinal frame members 36 and the transversely extending frame members 38, 39 and 40, are all formed of a tubular construction, and preferably a tubular metal construction. In this way, strength is maintained while light weight is also achieved.

Secured to the underside of each of the pairs of transversely extending frame members 39 and 40, at each of the opposite transverse ends of the cart, are a pair of mounting plates 42. The mounting plates 42 are essentially flat sheet metal plates and which may be welded or otherwise secured to the underside of the transversely extending frame members 39 and 40. Secured to the underside of the mounting plates 42 are conventional casters 44. Each of these conventional casters 44 usually comprise an upper plate 46, having a yoke 48 extending downwardly therefrom for supporting conventional wheels 50. This type of construction allows for easy attachment for the casters 44 and removal of the casters 44 from the mounting plates 42.

Other types of wheels in place of rollers or wheels 50 could be used in place of the casters 44. These other types of wheels or rollers would be secured to the mounting plates 42, much in the same manner as the casters 44 are secured to the mounting plates 42.

The base frame and the caster arrangement, as heretofore described, essentially constitutes the base frame 32 used in each of the other cart constructions of the present invention and particularly, in most of those cart constructions which are hereinafter described in more detail. However, and as indicated previously, other forms of wheels or rollers could be substituted for the casters 44 as shown.

FIGS. 10–12 of the drawings illustrate a somewhat modified form a base frame 32' and which is also constructed in accordance with and embodies the present invention. In this case those like components used in the base frame described in connection with FIGS. 6–8 of the drawings will be used herein and modified with the additional of the prime symbol to show likeness of components. The base frame 32' comprises a pair of transversely spaced apart, longitudinally extending frame members 36' and which are also connected at their ends by longitudinally spaced apart, transversely extending frame members 38'. In like manner, these frame members 38' are welded to the frame members 36', although other means of connection could be employed. The same holds true with regard to the other components forming part of the modified form of base frame 32'.

An additional pair of transversely extending frame members 39' and 40' are secured within the frame construction formed by the longitudinally extending frame members 36' and the transversely extending frame members 38'. These frame members 39' and 40' are similar to the frame members 39 and 40 used in the base frame construction of FIGS. 6–8. However, and in this case, the frame members 39' and 40' are not welded to the underside of the longitudinal frame members 38' and transversely extending frame members 39'. Rather, they are welded to the interior surfaces of these frame members 38' and 39', as best shown in FIGS. 10–12 of the drawings.

The frame members used in the base frame 32' are also formed of a tubular construction and preferably a tubular metal construction, much in the same manner as the previously described frame members. However, it should be understood that other materials of construction could be used, as hereinafter described.

Mounted on and extending between the transversely extending frame members 38 is an additional longitudinal frame member 52 in the embodiment of the cart, as shown in FIGS. 1–5. While only one additional longitudinal frame member has been illustrated, it should be understood that any desired number could be utilized.

Also secured to the base frame 32 and extending upwardly therefrom is the upper frame 34 comprised of a plurality of upright frame members 54. In the embodiment of the cart 30 as shown in FIGS. 1–5, three individual longitudinal rows of upright frame members are provided and include a front row 56. A middle row 57 extends upwardly from the longitudinal frame member 52. Finally, there is a rearwardly located row 58 of upright frame members.

A plurality of transversely extending shelf support rods 61 are also secured to and extend between the first row 56 of upright frame members 54 and the intermediate row 57 of these upright frame members 54. These shelf support members 61 thereby form individual compartments 62, as best shown in FIG. 1 and 2 of the drawings. Individual platforms or shelves 64 may be disposed on the shelf supporting members or rails 61 in the individual compartments 62. In like manner, cartons, such as conventional milk cartons, or like rectangularly shaped boxes 66 may also be disposed on and supported by the transversely extending shelf support members or rails 60 and 61, also as shown in FIG. 2.

The end upright frame members 54 in the front row 56 and in the intermediate row 57 form a quadrilateral arrangement of upright frame members and at their upper ends, are connected by horizontally disposed frame members 68 which receive an upper platform 70, as shown in FIGS. 1, 2 and 4 of the drawings. In this way, an elongate compartment 72 is formed on one longitudinal side of the cart for storage of elongate members, such as light support rods and the like.

The vertically disposed frame members 54 have upper extensions 74 in both the front row 56 and the intermediate row 57. These extensions 74 are connected at their upper ends by transversely extending bars 76 and an additional longitudinally extending bar 78 in order to provide a partial enclosure for the upper shelf 70. In this way, additional components can be stacked on the upper shelf 70.

In the embodiment of the invention as shown, an additional plate, such as a wooden shelf 80, may also be placed on the lower frame members 36 and 38, so as to form a lower shelf for the storage of various components. Again, this shelf could be eliminated, if desired. In most cases, however, it is preferred, since it also serves as a means for collecting any item which may fall.

FIGS. 13–17 illustrate another embodiment of a cart 94 constructed in accordance with and embodying the present invention. The cart 94 also includes the base frame structure 32, as shown, along with individual flat platforms or boards 96 disposed on the base frame 32, as shown. The cart 94 is provided with a pair of end upright frame members 98 located along one of the longitudinal edge of the frame 32 and pair of intermediate upright frame members 100 secured to an intermediate longitudinally extending horizontally disposed frame member 102. These frame members 98 and 100 form an enlarged rectangular compartment 104, as shown in FIGS. 13–17. If desired, this interior compartment 104 could be further subdivided into individual interior compartments, as may be desired.

Individual additional upright frame members 106 extend upwardly from the opposite longitudinal frame rail 36, as best shown in FIGS. 13 and 17, but which are of lesser height than the upright frame members 100 in order to form individual small compartments 108, as also shown in FIG. 12. This type of arrangement is also effective, depending upon the type of lighting equipment which is to be carried on the cart. The individual upright frame members 106 may also be connected by horizontally disposed longitudinally extending additional frame members 110 and additional horizontally disposed transversely extending frame members 112.

The upright frame members 98 are located at the four corners in a rectangular arrangement. They are connected at their upper ends by longitudinally extending frame rails 114 and upper transversely extending frame rails 115. Moreover, in order to support additional heavy loads, there is an intermediate longitudinally extending frame rail 116. The three frame rails 115 and 116, as best shown in FIGS. 13 and 16 of the drawings, are supported on their undersides by transversely extending struts 117. In this way, there is a fairly rigid upper structure for supporting heavy boxes or the like. In addition, and if desired, a relatively flat shelf or panel could be disposed at the upper end of this frame arrangement.

It can also be observed in connection with the cart 94, as illustrated in FIGS. 13–17 of the drawings, that the section formed by the upright frame members 106 and the upright frame members 100 has a height which is less than that which forms the enlarged compartment 104. Thus, the individual compartments 108 are smaller in size, than is the compartment 104. Moreover, it can be observed that these compartments 108 are also of differing sizes. Again, any type of compartment arrangement can be formed in accordance with the present invention.

FIGS. 18–21 illustrate another modified form of cart 120 constructed in accordance with and embodying the present invention and FIG. 22 illustrates a hook device 122 which is used with the cart 120. The cart 120 comprises a base frame 32 with four quadrilaterally located upright frame members 126 forming part of an upper frame. The upright frame members 126 form an individual compartment 128. A pair of transversely spaced apart longitudinally extending frame members 130, along with a pair of transversely extending longitudinally spaced apart frame members 132 form an individual shelf on the upright frame members 126, as shown. Further, a shelf (not shown) may be disposed in the area formed by the frame members 130 and 132 forming an enlarged pocket which may be further subdivided, as shown.

Individual, transversely extending rails 133 extend between the longitudinally extending frame members 130. These rails 133, along with vertically extending rails 134, subdivide the individual compartment 128 into a plurality (four, as shown) individual small compartments 135. These compartments 135 are sized to receive storage boxes or the like and which would rest upon the individual rails 133. Thus, the cart 120 is provided with the enlarged compartment 128 and a plurality of individual, relatively small compartments 135.

Another tier of horizontally disposed, longitudinally extending frame rails 136 and transversely extending horizontally disposed frame rails 137 also form an area for receiving a tray 138, as best shown in FIG. 18. This tray 138, as well as the individual compartments 135, are also used for the storage of lighting equipment and like structure. In addition, the upright frame members 126 may be provided with outwardly extending tabs 140 for reasons which will presently more fully appear, and as best shown in FIGS. 18, 19 and 21.

By further reference to FIGS. 18 and 19, it can be seen that there is an enlarged open space located forwardly of the intermediate upright frame members 126. This large space is used for purposes of storing elongate rod-like members, such as the hooks 122, forming part of the lighting equipment. To support the lower ends, a shelf 141, such as a wooden platform or the like, may be disposed on the lower frame members 36 and 38.

At it upper end, the one pair of the intermediate upright frame members 126 are provided with a longitudinally extending retaining bar 142 supported by means of a stub bar 144. By reference to FIG. 21, it can be seen that the stub bar 144 may be a vertically disposed upright member and may also be secured to an upper longitudinally extending frame member 145. The retaining bar 142 has ends which are spaced apart from the outwardly projecting tabs 140 forming an elongate retaining space 146 with access provided by a corner access area 147. In this way, hooks, such as the hook 122, may be inserted in the access space and retained on the retaining bar 142. These hooks 122 may also be effective in holding lighting equipment and like devices.

FIGS. 23–32 illustrate additional cart constructions in accordance with the present invention. These various cart constructions all illustrate the use of the base frame 32, along with different upper frame structures. FIG. 23, for example, illustrates an upright frame structure 150, having two large vertically arranged compartments 152 which may be provided with horizontal rails 154 for receiving boxes or the like. In addition, two elongate horizontally disposed compartments 156 are also provided, along with two smaller horizontally arranged upper compartments.

FIG. 24 illustrates a cart 160 which is further subdivided into a plurality of relatively small compartments 161 by a large number of horizontally disposed frame members 162 and vertically arranged frame members 164. An individual pair of rails 166 may also be located in certain of the smaller compartments 161 in order to support drawers, shelves or the like. By reference to FIG. 24, it can be seen that a very large number of individual compartment arrangements can be achieved in one cart.

FIGS. 25 and 26 illustrate a cart construction which does not utilize the previously described base frame 32. In this case, a cart construction 162 utilizes four quadrilaterally arranged upright frame members 164 and which are connected by a plurality of vertically spaced apart horizontally disposed frame members 166 forming individually horizontally arranged shelves 168. It can be seen, by reference to FIG. 26, that each of the individual horizontally disposed rails 166 retain shelves 168, such as wooden platforms or the like. At its lower end, the cart construction 162 is provided with an axle 168 retaining a pair of large diameter wheels 170, as best shown in both FIGS. 25 and 26. The other side of the cart 162 is not provided with wheels or casters. Rather, the cart may be tipped slightly for rolling on the large diameter wheels 168.

One of the unique advantages of the cart 162 is the fact that it is provided with a table structure 172 which may be collapsed against the side of the cart, as shown in FIG. 25, or opened in the manner as shown in FIG. 26. It can be seen that a retaining plate 174 is mounted against a side of the cart. Hingedly mounted on the retaining plate 174 is the table structure comprised of a tabletop 176 and legs 178. The legs 178 are hingedly connected at their upper ends by means of hinge pins 180 to the tabletop 176. Thus, when the table structure 172 is shifted to the closed position, the tabletop 176 will fold upwardly against the side of the cart and the legs 178 will fold against the exterior surface of the tabletop 176.

FIGS. 27 and 28 represent still a further modified form of cart 190, constructed in accordance with and embodying the present invention. The cart 190 generally comprises a base frame, such as the base frame 32, as previously described. A plurality of upright frame members 192 extend upwardly from the base frame. Three rows of these upright frame members 192 form spaces at the left-hand side of the cart, as best shown in FIG. 27. Individual rails 194 are located on the three rows of uprights and form individual compartments 196. These compartments 196 are designed to retain individual boxes, such as the milk boxes or the like, as previously described.

The right-hand side of the cart 190, as best illustrated in FIG. 27, is provided with a plurality of horizontally disposed rails 200 retaining individual shelves (not shown). In this way, individual drawers 202 can be located on each of the shelves for retaining smaller components used with the lighting equipment. Each of the drawers 202 are also provided with pull knobs 204. Moreover, the lowermost of the drawers 202 is a larger sized drawer. Here again, the rail spacing could be located to accommodate desired sizes of drawers.

FIGS. 29 and 30 illustrate a slightly modified form of cart 210, which is similar in construction to the previously described cart 162 in that it employs a pair of large diameter wheels 212. At its opposite end, the cart 210 is provided with casters, such as the casters 44 previously described.

Moreover, these casters 44 and the wheels 212 are mounted on a base frame 214 which is substantially similar to the previously described base frame 32 or the base frame 32'.

If desired, a table member may be secured to the cart 210 along with collapsible legs in the same manner as used in connection with the cart of FIGS. 25 and 26. In this way, the cart of FIG. 26 and the cart of FIGS. 29 and 30 would both be effective in having a work table removably mounted or otherwise, removably attached thereto. Thus, the table could be opened when the cart is in a stationary position.

In the embodiment of the cart, as illustrated in FIGS. 29 and 30, it can be seen that a plurality of upright frame members 216 are provided for forming a pair of longitudinally extending rear compartments 218 which extend for the length of the cart 210. In addition, additional small upright frame members 220 and horizontally disposed frame members 222 also form smaller compartments 224 on one side of the cart.

The cart 210, as shown in FIGS. 29 and 30, is similar to the previously described carts, except that it employs large diameter wheels 212 at one end thereof. These wheels are used when the loads carried by the cart of substantial weight. Moreover, they are used when the ground terrain is not a relatively flat and smooth surface.

FIG. 31 illustrates an embodiment of a cart 230 which also uses a collapsible table 232. The cart 230 is similar to the previously described carts in that it uses the base frame 32, along with the casters 44. Additional upright frame members 234 are mounted on the base frame 32 and are connected by horizontal frame members 236. These frame members 234 and 236 could be connected in a desired arrangement to form the individual compartments and shelves in any manner as previously described.

The table 232 is similarly mounted to one longitudinal side of the cart 230 by means of a hinge arrangement 238. The position of the table is shown in the dotted line of FIGS. 31 when the tabletop lies flat against the cart. Moreover, a diagonally arranged supporting leg 240 is also connected to the outer end of the table 232 and supports the same when the latter is in the opened position. The supporting arm 240 may be hingedly mounted on the underside of the table or on the cart, or it may be carried along with the cart.

FIG. 32 illustrates a further arrangement of a cart 250 constructed in accordance with and embodying the present invention. The cart 250 is provided with a base frame 32 having the caster arrangement 44, as previously described. Moreover, the cart 32 is provided with four quadrilaterally arranged uprights 252, along with horizontally disposed, transversely extending, vertically spaced apart intermediate rails 254. Individual wooden platforms 256 (shown in dotted lines) may be used to extend between the individual transversely extending rails 254 at the end of the cart. A top wooden platform 258 is also provided.

The cart 250 is further provided with integrally mounted pull handles 260. These pull handles are welded or otherwise rigidly secured to the upright frame members 252 and extend outwardly from the sides so that the cart itself may be pulled or pushed by a user of the same.

The various embodiments of the carts, as heretofore described, are only a non-limiting description and illustration of several of the carts which can be constructed using the basic components of the present invention. It is only necessary to use a base frame of the type previously described, along with a plurality of upright frame members and a plurality of horizontally disposed frame members. Individual shelves and the like can also be used to customize the cart to a particular desired arrangement.

All of the frame members are preferably tubular steel members and moreover, are of square cross sections. In this way, the carts of the invention have a wide degree of structural integrity and are capable of supporting substantial loads while maintaining a relatively light weight. In this way, even when the carts are fully loaded with lighting-type equipment, they are capable of being easily maneuvered and pushed around to a desired location and position.

It can be observed that the carts of the invention can be constructed with a large number of storage compartments. Moreover, the storage compartments can be sized, as required, to accommodate certain types of equipment. Shelves are also utilizable in the carts of the present invention. The shelves can be easily constructed from simple plywood sheets, as may be required. It is also possible to add hand-operated brakes to the carts, if desired. Further, the carts could be motorized for powered movement, if also desired. The carts are also capable of being towed behind a powered vehicle, such as a small tractor-type vehicle. For this purpose, a conventional hitch could be secured to the cart frame.

Thus, there has been illustrated and described a unique and novel cart for transporting lighting equipment which fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by letters patent is:

1. A multi-variant cart construction for the transport and storage of lighting equipment of the type used in stage lighting, said cart construction comprising:

a) a frame base which is generally orthogonal in shape and constructed of at least four orthogonally arranged tubular frame base members forming four orthogonally located corners and each of said base members being of generally rectangular shape in cross-section;

b) a plurality of first tubular upright frame members secured to said base frame and extending upwardly therefrom;

c) a plurality of second tubular upright members secured to said base frame and extending upwardly to a height which is different than said first tubular upright frame members;

d) a plurality of tubular horizontally arranged connecting frame members extending between said first upright frame members and at least partially connecting said upright frame members together and forming a plurality of first individual storage compartments;

e) said plurality of tubular horizontally arranged connecting members extending between said second upright frame members and said first upright frame members and at least partially connecting said upright frame members together and forming a plurality of second individual storage compartments, said second storage compartments extending upwardly to a height greater than said first individual storage compartments;

f) a plurality of elements extending into certain of the storage compartments for supporting storage containers which contain lighting equipment so that said storage containers can be easily inserted into and removed from said certain of the storage compartments;

g) at least one solid shelf disposed on and retained by said plurality of elements; and h) said frame base and said first and second tubular upright frame members and said horizontally arranged connecting frame members being of modular construction such that a plurality of cart constructions can be made to accommodate the type of stage lighting equipment which would be carried on the cart construction.

2. The multi-variant cart construction of claim 1 further characterized in that a solid shelf member is disposed in a plurality of said storage compartments.

3. The multi-variant cart construction of claim 1 further characterized in that said cart has at least one large compartment substantially larger than said storage compartments.

4. The multi-variant cart construction of claim 1 further characterized in that the plurality of elements in certain of said compartments comprise a pair of elements with one on each of the opposite sides of the compartments, each of said elements of a pair being located at a bottom of said compartment and extending inwardly into said compartment from the horizontally arranged frame members.

5. A cart construction for the transport and storage of lighting equipment of the type used in stage lighting, said cart construction comprising:

a) a frame base which is generally rectangular in shape and constructed of at least two longitudinally extending generally parallel tubular frame base members;

b) at least two transversely extending generally parallel tubular frame base members connected to the ends of said longitudinally extending frame base members thereby creating four orthogonally arranged corners;

c) a pair of spaced apart transversely extending struts mounted on said longitudinally extending base members and transversely extending base members of said frame base near the underside thereof and at or adjacent each of the transverse ends thereof, said pair of struts at or adjacent each of the opposite transverse ends of the base frame being closely spaced apart from one another;

d) a mounting plate secured to the underside of said frame base at each of said four corners thereof;

e) wheel means on the underside of said mounting plate at each of said corners;

f) a plurality of first upright frame members connected to said frame base and extending upwardly therefrom;

g) a plurality of second tubular upright members secured to said base frame and extending upwardly to a height which is different than said first tubular upright frame members;

h) a plurality of first horizontally arranged longitudinally extending connecting frame members forming an upper frame structure therewith;

I) a plurality of second horizontally arranged transversely extending connecting frame members connected at said longitudinally extending frame members and said upright frame members and thereby forming individual first storage compartments in said upper frame structure;

j) said plurality of tubular horizontally arranged connecting members extending between said second upright frame members and said first upright frame members and at least partially connecting said upright frame members together and forming a plurality of second individual storage compartments, said second storage compartments extending upwardly to a height greater than said first individual storage compartments; and k) said frame base and said first and second tubular upright frame members and said horizontally arranged connecting frame members being of modular construction such that a plurality of cart constructions can be made to accommodate the type of stage lighting equipment which would be carried on the cart construction.

6. The cart construction of claim 5 further characterized in that said upper frame structure comprises an upper frame support and an upper platform is located on said upper frame support for holding lighting equipment.

7. The cart construction of claim 6 further characterized in that a railing extends around a portion of said upper platform.

8. The cart construction of claim 7 further characterized in that said platform extends longitudinally for almost the entire longitudinal dimension of the cart and only a portion of the transverse dimension of the cart and that the remaining portion of the transverse dimension is occupied by an elongate longitudinally extending storage compartment.

9. The cart construction of claim 5 further characterized in that said frame members are constructed to create an enlarged longitudinally extending compartment which extends for substantially the entire longitudinal dimension of the cart and for a greater portion of the transverse dimension of the cart and that the remaining portion of the transverse dimension of the cart is occupied by a plurality of longitudinally spaced apart individual storage compartments.

10. The cart construction of claim 9 further characterized in that two of said longitudinally spaced apart storage compartments are elongate and one of said storage compartments forms a somewhat deeper compartment.

11. The cart construction of claim 5 further characterized in that said upper frame structure comprises a pair of spaced apart elongate bars at its upper end forming a slot to receive and removably hold vertically orientated elongate lighting equipment.

12. A cart construction of claim 11 further characterized in that said frame base has a platform thereon.

* * * * *